United States Patent
An

(10) Patent No.: US 7,656,469 B2
(45) Date of Patent: Feb. 2, 2010

(54) STRUCTURE FOR MOUNTING DISPLAY HOUSING TO MONITOR STAND

(75) Inventor: Sam Young An, Kyongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 436 days.

(21) Appl. No.: 10/144,837

(22) Filed: May 15, 2002

(65) Prior Publication Data

US 2002/0180661 A1  Dec. 5, 2002

(30) Foreign Application Priority Data

May 30, 2001 (KR) .................... P2001-0030038

(51) Int. Cl.
G02F 1/1333 (2006.01)
(52) U.S. Cl. .................................................. 349/58
(58) Field of Classification Search ............... 349/58, 349/60; 345/905; 361/681, 682; 348/180, 348/184, 325; 248/917; 16/376, 372
See application file for complete search history.

(56) References Cited

U.S. PATENT DOCUMENTS

| | | | | |
|---|---|---|---|---|
| 5,713,549 A * | 2/1998 | Shieh | ............... | 248/284.1 |
| 5,812,368 A * | 9/1998 | Chen et al. | ............... | 361/681 |
| 6,151,207 A * | 11/2000 | Kim | ............... | 361/681 |
| 6,166,788 A * | 12/2000 | Ha et al. | ............... | 349/58 |
| 6,170,408 B1 * | 1/2001 | Gombrich | ............... | 108/90 |
| 6,229,584 B1 * | 5/2001 | Chuo et al. | ............... | 349/58 |
| 6,233,139 B1 * | 5/2001 | Hamon | ............... | 361/681 |
| 6,292,239 B1 * | 9/2001 | Nagamura et al. | ............... | 349/58 |
| 6,330,148 B1 * | 12/2001 | Won et al. | ............... | 361/681 |
| 6,392,724 B2 * | 5/2002 | An et al. | ............... | 349/58 |
| 6,418,010 B1 * | 7/2002 | Sawyer | ............... | 361/681 |
| 6,476,884 B1 * | 11/2002 | Shao | ............... | 349/58 |
| 6,502,792 B1 * | 1/2003 | Cho et al. | ............... | 248/121 |
| 6,512,558 B2 * | 1/2003 | Kim | ............... | 349/58 |
| 6,517,040 B1 * | 2/2003 | Wen | ............... | 248/278.1 |
| 6,636,282 B2 * | 10/2003 | Ogawa et al. | ............... | 349/58 |
| 6,741,298 B1 * | 5/2004 | Won | ............... | 349/58 |
| 2003/0189155 A1 * | 10/2003 | Serbinski et al. | ............... | 248/371 |

FOREIGN PATENT DOCUMENTS

| | | |
|---|---|---|
| CN | 2379866 Y | 5/2000 |
| JP | 06-19381 | 3/1994 |
| JP | 09-274444 | 10/1997 |
| JP | 10-198286 | 7/1998 |
| JP | 10-294914 | * 11/1998 |
| JP | 2000-333100 | 11/2000 |

* cited by examiner

*Primary Examiner*—Timothy Rude
(74) *Attorney, Agent, or Firm*—Morgan, Lewis & Bockius LLP

(57) ABSTRACT

A structure for mounting a display housing to a monitor stand of a monitor having a flat display, the display housing for the flat display, and a stand bracket for holding the display housing, includes fastening members at the stand bracket, and coupling members fixed to a rear case of the flat display in correspondence to the fastening members, wherein the fastening members are directly fastened to the coupling members respectively, to mount the display housing to the stand bracket.

2 Claims, 3 Drawing Sheets

STRUCTURE FOR MOUNTING DISPLAY HOUSING TO MONITOR STAND

The present invention claims the benefit of Korean Patent Application No. P2001-30038 filed in Korea on May 30, 2001, which is hereby incorporated by reference.

BACKGROUND OF THE INVENTION

1. Field of the Invention

The present invention relates to a display housing for a monitor, and more particularly, to a structure for mounting a display housing of a flat display to a monitor stand.

2. Background of the Related Art

A display housing may be assembled with a flat display, such as a Liquid Crystal Display (LCD), a Plasma Display Panel (PDP), a Field Emission Display (FED), and the like.

In FIG. 1, an LCD is provided with a back light part 1 for emitting a light, a display part (or a liquid crystal panel part) 2 fitted in front of the back light part 1 for receiving the light emitted from the back light part 1 to present image data (or picture), a frame 3 for holding edges of the back light part 1 and the display part 2 to maintain a required gap between the back light part 1 and the display part 2, and a front case 4 and a rear case 5 for putting the back light part 1, the display part 2, and the frame 3 together, thereby reproducing the picture by utilizing molecular movements of the liquid crystals (not shown) in the liquid crystal panel part 2.

In FIG. 2, a monitor is provided with a flat display 10 for displaying a picture, a display housing 20 for fitting the flat display 10 therein, and a stand 30 for holding and adjusting an angle of the display housing 20.

FIG. 3 shows the monitor of FIG. 2 in detail. In FIG. 3, the display housing 20 is provided with a front housing 21 on a front surface of the flat display 10 having an opening 21a for exposing the display part 2 of the flat display to the air, and a rear housing 22 on a rear surface of the flat display 10. The stand 30 is provided with a stand arm 31 in rear of the rear housing 22 for holding the display housing 20 at a height from a floor, and a stand body 32 for supporting the stand arm 31. The stand 30 includes: a metal frame 40 of a plate fitted between the flat display 10 and the rear housing 22 having pass through holes 22a for serving as a supporting frame of the display housing 20 having fastening holes 40a in a surface facing an inside surface of the rear housing 22 in correspondence to the pass through holes 22a; a stand bracket 33 at an end of the stand arm 31 in rear of the rear housing 22 having coupling holes 33a in correspondence to the fastening holes 40a; and screws 50 for fastening the coupling holes 33a in the stand bracket 33, the pass through holes 22a in the rear housing 22, and the fastening holes 40a in the metal frame in succession for assembling the display housing 20 to the stand 30.

The metal frame 40 is used because strength of the rear housing 22 is too weak to assemble the display housing 20 to the stand 30 by fastening the screws 50 only to the rear housing 22. Specifically, since the display housing 20 is made of injection molded plastic, its own weight may cause it to break. Accordingly, additional high strength metal frame 40 is employed if the screws 50 are fastened only to the rear housing 22. However, the metal frame 40 causes the following problems. First, use of the heavy metal frame 40 increases overall weight of the monitor. Second, placing the metal frame 40 between the flat display 10 and the rear housing 22 increases an overall thickness of the display housing 20 thicker. Third, the metal frame 40 requires additional fabrication steps, thereby decreasing productivity. Fourth, the metal frame 40 increases costs.

SUMMARY OF THE INVENTION

Accordingly, the present invention is directed to a structure for mounting a display housing to a monitor stand that substantially obviates one or more of the problems due to limitations and disadvantages of the related art.

An object of the present invention is to provide a structure for mounting a display housing to a monitor stand, in which weight and thickness of a monitor is reduced for improving reliability and workability of the apparatus, while reducing production cost of the structure.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a structure for mounting a display housing to a monitor stand of a monitor having a flat display, the display housing for the flat display, and a stand bracket for holding the display housing includes fastening members at the stand bracket, and coupling members fixed to a rear case of the flat display in correspondence to the fastening members, wherein the fastening members are directly fastened to the coupling members respectively, to mount the display housing to the stand bracket.

In another aspect, a structure for mounting a display housing to a monitor stand includes a plurality of fastening members disposed on a stand bracket, and a plurality of coupling members fixed to a rear case of a liquid crystal display directly fastened to the plurality of fastening members.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
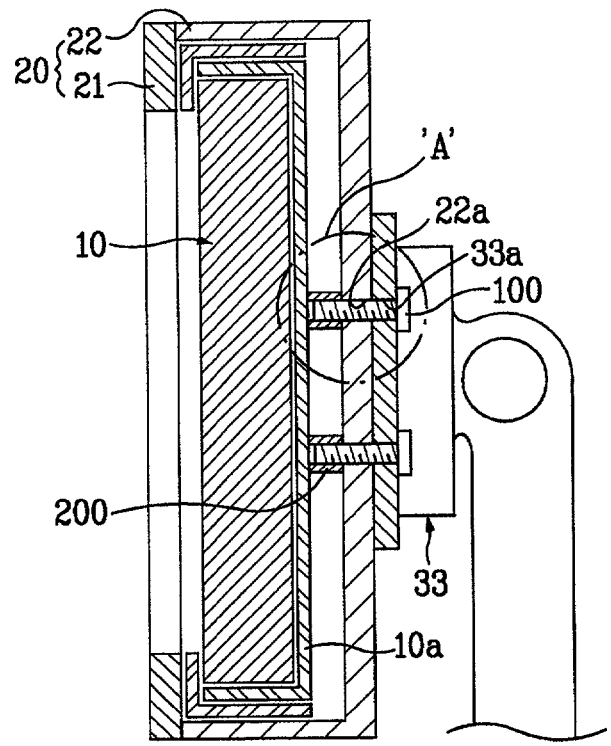
FIG. 4 illustrates a cross sectional view of an exemplary structure for mounting a display housing to a monitor stand according to the present invention.
Figure 5:
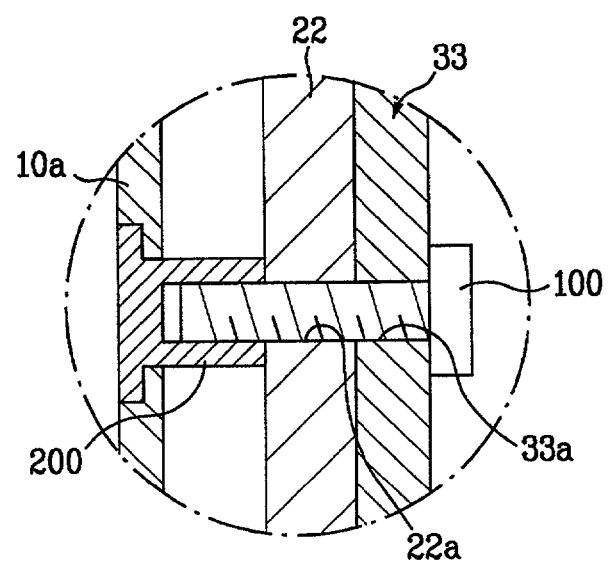
FIG. 5 illustrates detail "A" of FIG. 4.

FIG. 4 illustrates a cross sectional view of an exemplary structure for mounting a display housing to a monitor stand according to the present invention, and FIG. 5 illustrates detail "A" of FIG. 4. Structures identical to the related art will be given reference symbols identical to the related art.

Figure 1:
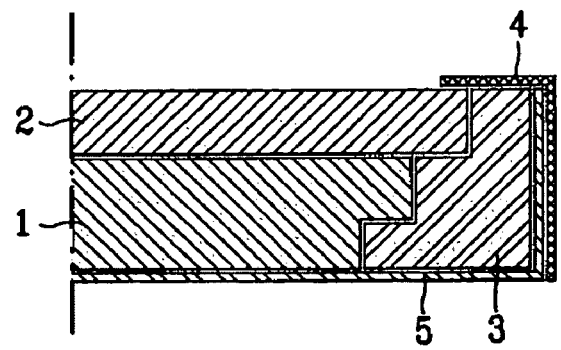
FIG. 1 illustrates a cross sectional view of a LCD according to the related art.
Figure 2:
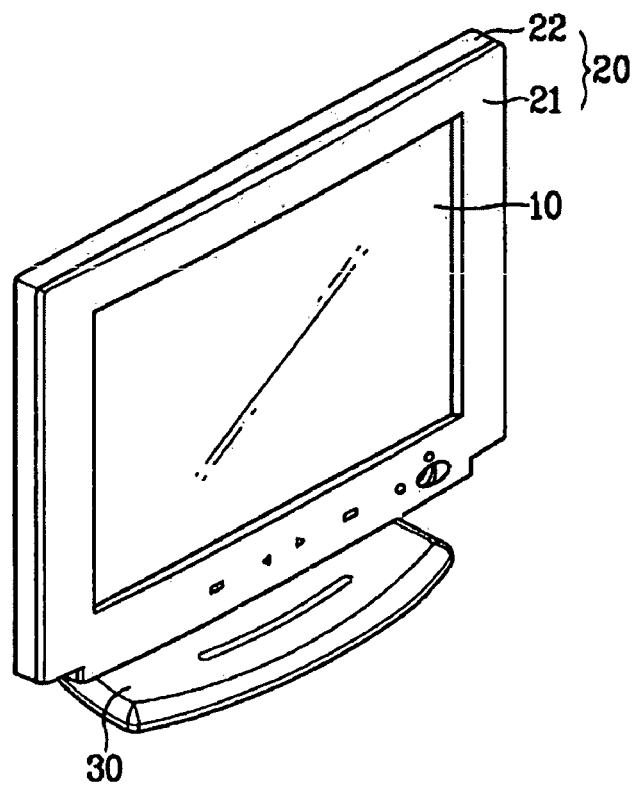
FIG. 2 illustrates a perspective view of a monitor with a flat display according to the related art.
Figure 3:
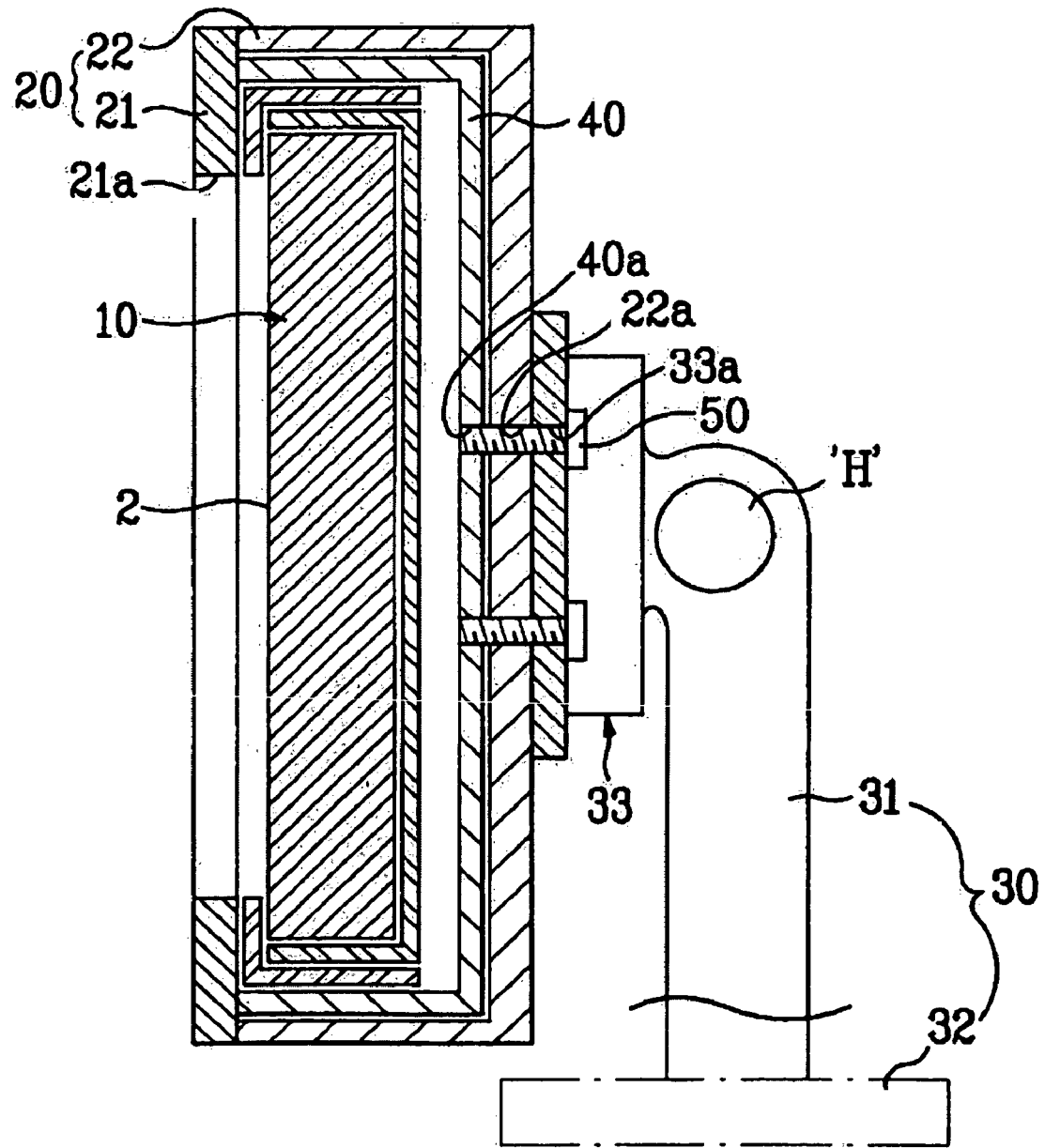
FIG. 3 illustrates a cross sectional view of a monitor showing a structure for mounting a display housing to a monitor stand according to the related art.

In FIG. 4, a structure for mounting a display housing to a monitor stand of a monitor may include a flat display 10, a display housing 20 for the flat display 10, and a stand bracket 33. The structure may include fastening members 100 at the stand bracket 33 and coupling members 200 fixed to a rear case 10a of the flat display 10. Fastening members 100 and coupling members 200 are coupled to the fastening members to mount the display housing 20 having the flat display 10 fitted therein to the stand bracket 33. The fastening members 100 may be bolts, and the coupling members 200 may be nuts. Alternatively, the fastening members 100 may be nuts, and the coupling members 200 may be bolts. The bolts 100 may be inserted in coupling holes 33a in the stand bracket 33, and fastened with the nuts 200. The coupling members 200 may be formed as a unit with the rear case 10a, or fixed by welding, riveting, or forced press fit. It is preferable that the rear case 10a of the flat display 10 is formed of a metal for strong coupling with the fastening members 200, and sustaining a load on the fastening members 200. The flat display 10 with the metal rear case may be the LCD shown in FIG. 1.

In view of a general monitor structure, it is preferable that the structure for mounting a display housing to a monitor stand according to the present invention further include a structure having a rear housing 22 of the display housing 20 between the rear case 10a of the flat display 10 and the stand bracket 33, and pass through holes 22a for the bolts in the rear housing, as shown in FIGS. 4 and 5.

An exemplary assembly process of the structure for mounting a display housing to a monitor stand according to the present invention will be explained with reference to FIG. 4.

The rear case 10a of the flat display 10, the rear housing 22, and the stand bracket 33 are aligned such that the nuts 200, the pass through holes 22a, and the coupling holes 33a are on inline. Then, the bolt 100 is inserted through the coupling hole 33a, the pass through holes 22a, and the nut 200 in succession, and turns, to fasten the bolt 100 to the nut 200.

As has been explained, the structure for mounting a display housing to a monitor stand of the present invention has the following advantages. Weight and thickness of the monitor can be reduced to provide a lighter and thinner apparatus, which improves reliability of the apparatus. Workability is improved, thereby reducing production costs.

It will be apparent to those skilled in the art that various modifications and variations can be made in the structure for mounting a display housing to a monitor stand of the present invention without departing from the spirit or scope of the invention. Thus, it is intended that the present invention cover the modifications and variations of this invention provided they come within the scope of the appended claims and their equivalents.

What is claimed is:

1. A structure for mounting a display housing to a monitor stand of a monitor having a flat display, the display housing for the flat display, and a stand bracket for holding the display housing, the structure comprising:

a rear case formed of a metal to directly enclose sides and an entirety of a rear surface of the flat display, the rear case directly contacting the sides and the entirety of the rear surface of the flat display and having a recessed surface on the front of the rear case;

a front case directly enclosing a perimeter of a front surface of the display and sides of the rear case;

the display housing including a rear housing between the rear case of the flat display and the stand bracket, the rear housing including pass through holes formed therein, and a front housing to cover the front surface of the flat display;

coupling holes formed in the stand bracket in correspondence to the pass through holes;

nuts fixed to a rear surface of the rear case in correspondence to the coupling holes, the nuts directly contacting an inside surface of the rear housing and the recessed surface of the rear case;

bolts fastening to the nuts through the coupling holes and the pass through holes, respectively, to mount the display housing to the stand bracket, an upper side surface of the bolts fastened to the rear housing and the stand bracket and a rear surface of the bolts and a remaining side surface expect the upper side surface of the bolts fastened to the nuts, wherein the display housing directly encloses the flat display enclosed by the rear and front cases, the bolts are fastened to the nuts in a direction substantially perpendicular to the rear surface of the rear case, and the bolts extend into a space between the rear case and the rear housing such that the bolts are inserted in the nuts projecting into the space between the rear case and the rear housing.

2. The structure according to claim 1, wherein the flat display is an LCD.

* * * * *